United States Patent
Rao et al.

(10) Patent No.: US 7,739,541 B1
(45) Date of Patent: Jun. 15, 2010

(54) SYSTEM AND METHOD FOR RESOLVING CLUSTER PARTITIONS IN OUT-OF-BAND STORAGE VIRTUALIZATION ENVIRONMENTS

(75) Inventors: Santosh S. Rao, Santa Clara, CA (US); Gopal Sharma, San Jose, CA (US); Poonam P. Dhavale, Sunnyvale, CA (US)

(73) Assignee: Symantec Operating Corporation, Mountain View, CA (US)

( * ) Notice: Subject to any disclaimer, the term of this patent is extended or adjusted under 35 U.S.C. 154(b) by 328 days.

(21) Appl. No.: 10/627,385

(22) Filed: Jul. 25, 2003

(51) Int. Cl.
*G06F 11/00* (2006.01)
(52) U.S. Cl. ............... 714/4; 709/205; 709/220; 709/232; 714/6; 714/13
(58) Field of Classification Search ............ 709/205, 709/220, 232; 714/4, 6, 13
See application file for complete search history.

(56) References Cited

U.S. PATENT DOCUMENTS

| | | | |
|---|---|---|---|
| 5,740,348 A | 4/1998 | Cunliffe et al. ........ 395/182.04 |
| 5,978,933 A | 11/1999 | Wyld et al. ................. 714/13 |
| 5,999,712 A * | 12/1999 | Moiin et al. ............... 709/220 |
| 6,002,851 A | 12/1999 | Basavaiah et al. ...... 395/182.02 |
| 6,192,401 B1 * | 2/2001 | Modiri et al. .............. 709/220 |
| 6,226,717 B1 * | 5/2001 | Reuter et al. ............... 711/147 |
| 6,279,032 B1 * | 8/2001 | Short et al. ................ 709/209 |
| 6,286,056 B1 | 9/2001 | Edgar et al. ................. 710/5 |
| 6,338,112 B1 * | 1/2002 | Wipfel et al. ............... 710/269 |
| 6,363,495 B1 * | 3/2002 | MacKenzie et al. ............ 714/4 |
| 6,532,494 B1 * | 3/2003 | Frank et al. ................ 709/224 |
| 6,658,478 B1 * | 12/2003 | Singhal et al. ............. 709/232 |
| 6,658,587 B1 * | 12/2003 | Pramanick et al. ............ 714/5 |
| 6,871,222 B1 * | 3/2005 | Frank et al. ................ 709/223 |
| 6,925,492 B2 * | 8/2005 | Shirriff .................. 709/220 |
| 6,965,936 B1 * | 11/2005 | Wipfel et al. .............. 709/224 |
| 7,299,229 B2 * | 11/2007 | Doyle et al. ................. 707/8 |
| 7,464,378 B1 * | 12/2008 | Limaye et al. ............. 718/100 |
| 2001/0032324 A1 * | 10/2001 | Slaughter et al. .............. 714/4 |
| 2002/0095489 A1 * | 7/2002 | Yamagami .................. 709/224 |
| 2002/0194276 A1 | 12/2002 | Endo .......................... 709/205 |
| 2003/0009511 A1 * | 1/2003 | Giotta et al. ................ 709/201 |
| 2004/0010538 A1 * | 1/2004 | Miller et al. ............... 709/201 |

(Continued)

FOREIGN PATENT DOCUMENTS

EP    0810526 A1    3/1997

(Continued)

*Primary Examiner*—Nathan Flynn
*Assistant Examiner*—Mohamed Wasel
(74) *Attorney, Agent, or Firm*—Campbell Stephenson LLP

(57) ABSTRACT

Systems, methods, apparatus and software can configure, support, and make use of a coordinator virtual device to determine which node or nodes of a cluster should be ejected from the cluster as a result of a cluster partition or other error event. Fencing software operating on the cluster nodes monitors the cluster for a cluster partition (split-brain) event, and when such an event occurs, software on the nodes attempts to gain control of the coordinator virtual device. A node that succeeds in gaining control of the coordinator virtual device survives. Nodes failing to gain control of the coordinator virtual device remove themselves or are removed from the cluster. The coordinator virtual device can be established by a virtual device configuration server which provides coordinator virtual device access to cluster nodes acting as virtual device configuration clients.

25 Claims, 9 Drawing Sheets

U.S. PATENT DOCUMENTS

2004/0210673 A1 * 10/2004 Cruciani et al. ............. 709/246
2004/0215614 A1 * 10/2004 Doyle et al. .................... 707/8
2005/0268154 A1 * 12/2005 Wipfel et al. ................... 714/4
2005/0283641 A1 * 12/2005 Clark et al. .................... 714/4

FOREIGN PATENT DOCUMENTS

| EP | 810526 A1 * | 12/1997 |
| EP | 1122649 A1 | 8/2001 |
| EP | 1274012 A2 * | 1/2003 |
| EP | 1274012 A2 | 8/2003 |
| JP | 2001014201 A2 | 1/2001 |
| WO | WO 98/33121 A1 | 7/1998 |
| WO | WO 9833121 A1 * | 7/1998 |
| WO | WO 02/50678 | 6/2002 |
| WO | WO 03/027903 A1 | 4/2003 |
| WO | WO 2004051479 A2 * | 6/2004 |

* cited by examiner

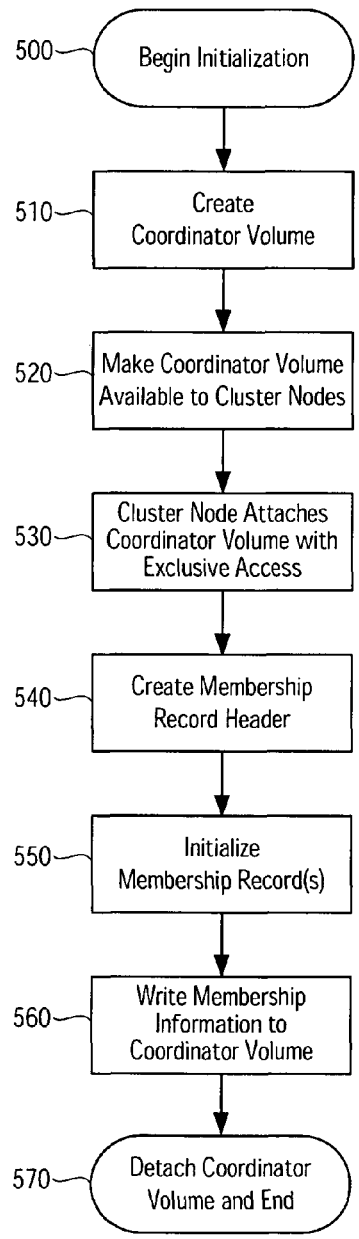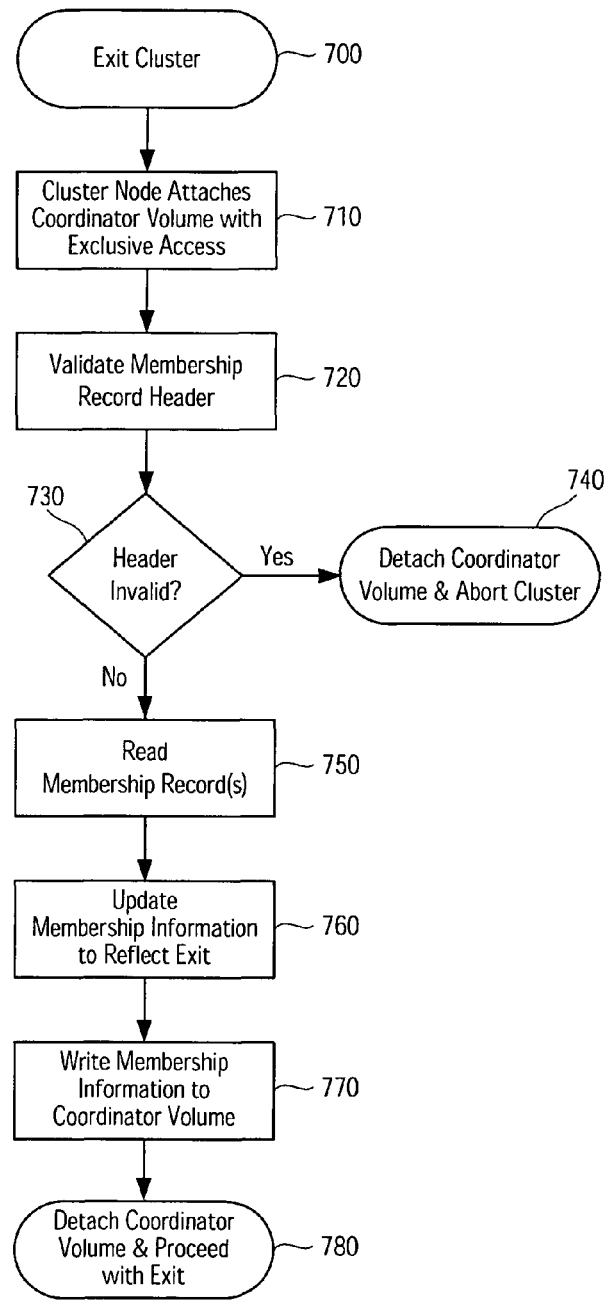
FIG. 5
FIG. 7

SYSTEM AND METHOD FOR RESOLVING CLUSTER PARTITIONS IN OUT-OF-BAND STORAGE VIRTUALIZATION ENVIRONMENTS

FIELD OF THE INVENTION

The present invention relates to the field of fault tolerance in distributed computer systems and, more particularly, to preventing data corruption on a shared resource of a computer system cluster.

BACKGROUND OF THE INVENTION

Distributed computing systems are an increasingly important part of research, governmental, and enterprise computing systems. Among the advantages of such computing systems are their ability to handle a variety of different computing scenarios including large computational problems, high volume data processing situations, and high availability situations. For applications that require the computer system to be highly available, e.g., the ability to maintain the system while still providing services to system users, a cluster of computer systems is a useful implementation of the distributed computing model. In the most general sense, a cluster is a distributed computer system that works together as a single entity to cooperatively provide processing power and mass storage resources. With a cluster, the processing load of the computer system is typically spread over more than one computer, thereby eliminating single points of failure. Consequently, programs executing on the cluster can continue to function despite a problem with one computer in the cluster. In another example, one or more computers of the cluster can be ready for use in the event that another computer in the cluster fails. While each computer in a cluster typically executes an independent instance of an operating system, additional clustering software is executed on each computer in the cluster to facilitate communication and desired cluster behavior.

FIG. 1 illustrates a simplified example of a cluster 100. The members of the cluster include Server A 110 and Server B 120. As members of cluster 100, servers 110 and 120 are often referred to as "hosts" or "nodes." Thus, a node in a computer cluster is typically an individual computer system having some or all of the common as is well known in the art. FIG. 11 (described later in this application) illustrates some of the features common to cluster nodes. Another common feature of a cluster is the ability of the nodes to exchange data. In the example of FIG. 1, servers 110 and 120 can exchange data over network 150, typically a local area network (LAN), e.g., an enterprise-wide intranet, or a wide area network (WAN) such as the Internet. Additionally, network 150 provides a communication path for various client computer systems 140 to communicate with servers 110 and 120. In addition to network 150, servers 110 and 120 can communicate with each other over private network 130. As shown, private network 130 is only accessible by cluster nodes, i.e., Server A 110 and Server B 120. To support the high availability of cluster 100, private network 130 typically includes redundancy such as two network paths instead of one. Private network 130 is used by the nodes for cluster service message passing including, for example, the exchange of so-called "heart-beat" signals indicating that each node is currently available to the cluster and functioning properly.

Other elements of cluster 100 include storage area network (SAN) 160, SAN switch 165, and storage devices such as tape library 170 (typically including one or more tape drives), a group of disk drives 180 (i.e., "just a bunch of disks" or "JBOD"), and intelligent storage array 190. These devices are examples of the type of storage used in cluster 100. Other storage schemes include the use of shared direct-attached storage (DAS) over shared SCSI buses. SAN 160 can be implemented using a variety of different technologies including fibre channel arbitrated loop (FCAL), fibre channel switched fabric, IP networks (e.g., iSCSI), Infiniband, etc.

SAN switch 165 and storage devices 170, 180, and 190 are examples of shared resources. The most common shared resource in a cluster is some form of shared data resource, such as one or more disk drives. Using a shared data resource gives different nodes in the cluster access to the same data, a feature that is critical for most cluster applications. Although a disk device is perhaps the most common example of both a shared resource and a shared data resource, a variety of other types of devices will be well known to those having ordinary skill in the art. Moreover, although servers 110 and 120 are shown connected to storage array storage devices through SAN switch 165 and SAN 160, this need not be the case. Shared resources can be directly connected to some or all of the nodes in a cluster, and a cluster need not include a SAN. Alternatively, servers 110 and 120 can be connected to multiple SANs. Additionally, SAN switch 165 can be replaced with a SAN router or a SAN hub.

One known problem among computer system clusters occurs when one or more of the nodes of the cluster erroneously believes that other node(s) are either not functioning properly or have left the cluster. This "split-brain" condition results in the effective partitioning of the cluster into two or more subclusters. Causes of the split-brain condition include failure of the communication channels between nodes, e.g., failure of private network 130, and the processing load on one node causing an excessive delay in the normal sequence of communication among nodes, e.g., one node fails to transmit its heartbeat signal for an excessive period of time. For example, if cluster 100 is configured for failover operation with an application program operating on server A 110 and server B 120 existing in the cluster to takeover for server A should it fail, then complete failure of private network 130 would lead server B to conclude that server A has failed. Server B then begins operation even though server A has not in fact failed. Thus, the potential exists that the two servers might attempt to write data to the same portion of one of the storage devices thereby causing data corruption. The solution is to ensure that one of the nodes cannot access the shared resource, i.e., to "fence off" the node from the resource.

Cluster partitioning can take a variety of other forms and have a variety of detrimental effects. For example, a node might attempt to reenter a cluster after the node has already been successfully excluded from the cluster. Thus, the reentering node might encounter a cluster environment setup to exclude the node and interpret that instead as a partition event. Additionally, cluster partitioning can be problematic even though there is no shared resource among the cluster nodes. For example, if one node of a cluster is supposed to be the node interacting with a client device and another node detects a cluster partition, the client device could ultimately communicate with the wrong node thereby leading to some manner of error.

Many prior art fencing mechanisms and cluster partition recovery schemes rely on cluster nodes and the cluster software operating on those nodes to have direct access to and/or control of certain shared resources. For example, such mechanisms or schemes might utilize specific coordinator or quorum disk drives, control of which is used to determine which node or nodes survive a cluster partition event and which should be fenced off. These schemes present a number of disadvantages when certain storage virtualization techniques, e.g., out-of-band virtualization techniques are employed.

For example, in-band and out-of-band storage virtualization, as opposed to host-based storage virtualization or storage-based virtualization, provides users with virtualization between the hosts and the storage. Using a storage appliance such as a specialized switch, router, server, or other storage device, in-band and out-of-band storage virtualization allows for the same level of control and centralization across the storage architecture. An in-band virtualization appliance is physically located between the host and the storage. The appliance takes the disk requests from the host and fulfills the host's request from the storage attached to the other side of the appliance. This functionality is essentially transparent to the host because the appliance presents itself as disk. Out-of-band appliances logically present themselves as if they are located in the data path between the host and storage, but they actually reside outside of the data path. Thus, in an out-of-band implementation the data flow is separated from the control flow. This is accomplished, for example, with the installation of a "thin" virtualization driver on the host in the I/O data path. The out-of-band appliance provides the virtualization driver with the storage mappings. The virtualization driver presents virtual storage devices to the applications and file systems on the host and sends the blocks of data directly to correct destinations on disks. In contrast, the in-band appliance requires no host-side changes. It acts as a surrogate for a virtual storage device and performs mapping and I/O direction in a device or computer system located outside of the host.

Accordingly, it is desirable to have scalable, flexible, and robust I/O fencing schemes for handling cluster partition conditions in certain storage virtualization environments to prevent data corruption on a shared data resource used by the cluster.

SUMMARY OF THE INVENTION

It has been discovered that systems, methods, apparatus and software can configure, support, and make use of a coordinator virtual device to determine which node or nodes of a cluster should be ejected from the cluster as a result of a cluster partition or other error event. Fencing software operating on the cluster nodes monitors the cluster for a cluster partition (split-brain) event, and when such an event occurs, software on the nodes attempts to gain control of the coordinator virtual device. A node that succeeds in gaining control of the coordinator virtual device survives. Nodes failing to gain control of the coordinator virtual device remove themselves or are removed from the cluster. The coordinator virtual device can be established by a virtual device configuration server which provides coordinator virtual device access to cluster nodes acting as virtual device configuration clients.

Fencing software operating on the cluster nodes monitors the cluster for a cluster partition (split-brain) event. When such an event occurs, software on at least two of the nodes attempts to unregister other nodes from a majority of coordinator resources. The node that succeeds in gaining control of the majority of coordinator resources survives. Nodes failing to gain control of a majority of coordinator resources remove themselves from the cluster. The winning node can also proceed to unregister ejected nodes from shared data resources. These operations can be performed in parallel to decrease failover time. The software can continue to execute on all nodes to prevent additional problems should a node erroneously attempt to reenter the cluster.

Accordingly, one aspect of the present invention provides a method. A coordinator virtual device corresponding to at least a portion of a physical data storage device is provided. The occurrence of a computer system cluster partition is detected. An attempt is made to gain control of the coordinator virtual device. At least one of the plurality of nodes is removed from the computer system cluster when the attempting is unsuccessful.

In another aspect of the present invention, a system includes a first data storage device, a virtual device configuration server, and a plurality of virtual device configuration clients. The virtual device configuration server is coupled to the first storage device and include a first memory and a first processor configured to provide a coordinator virtual device corresponding to at least a portion of the first data storage device. The plurality of virtual device configuration clients are configured as a computer system cluster. At least one of the plurality of virtual device configuration clients includes a second memory and a second processor. The second processor is configured to detect when the computer system cluster is partitioned. The second processor is also configured to attempt to gain control of the coordinator virtual device corresponding to at least a portion of the first data storage device. The second processor is further configured to remove the at least one of the plurality of virtual device configuration clients from the computer system cluster when the attempt to gain control of the coordinator virtual device is unsuccessful.

Yet another aspect of the present invention provides an apparatus comprising: a means for providing a coordinator virtual device corresponding to at least a portion of a physical data storage device; a means detecting when a computer system cluster, including a plurality of nodes, is partitioned; a means for attempting to gain control of the coordinator virtual device; and a means for removing at least one of the plurality of nodes from the computer system cluster when the attempting is unsuccessful.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways including implementation in hardware, i.e. ASICs and special purpose electronic circuits, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

FIG. 5 is a flow chart illustrating initialization techniques of the present invention.

FIG. 7 is a flow chart illustrating cluster exit techniques of the present invention.

DETAILED DESCRIPTION

The following sets forth a detailed description of at least the best contemplated mode for carrying out the one or more devices and/or processes described herein. The description is intended to be illustrative and should not be taken to be limiting.

Figure 1:
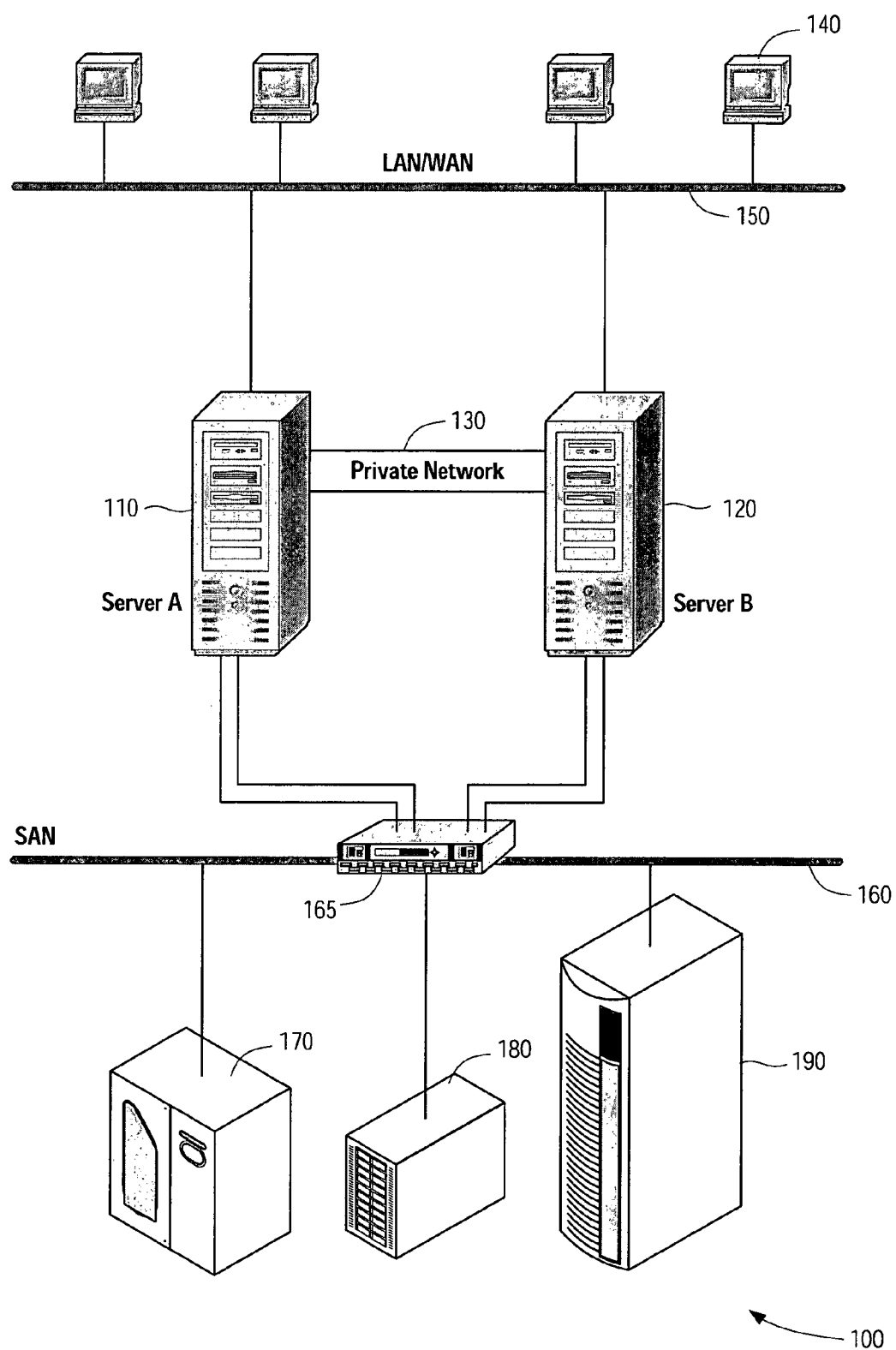
FIG. 1 is a simplified block diagram of a computer system cluster.
Figure 2:
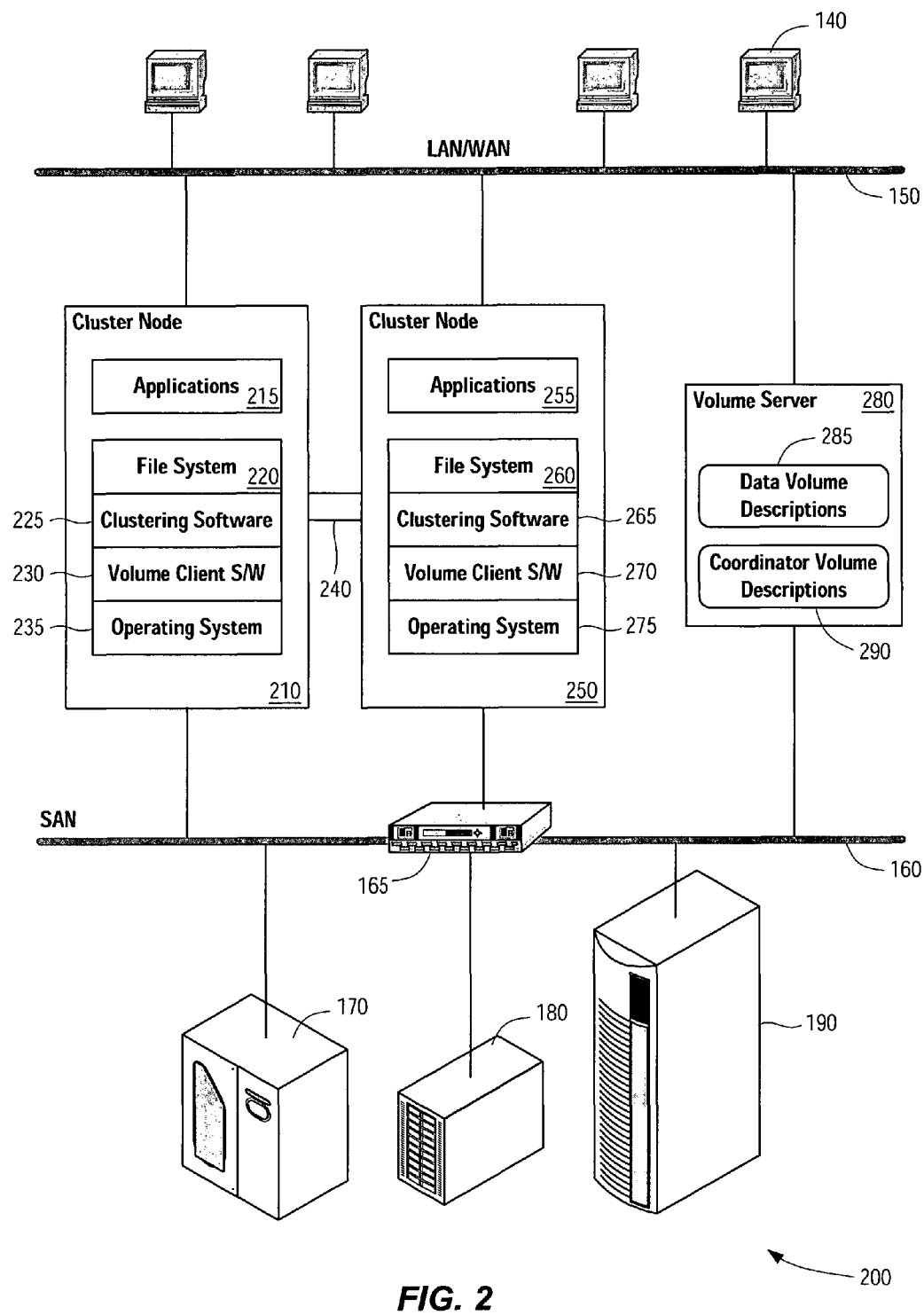
FIG. 2 is a simplified block diagram of computer system cluster utilizing some of the systems and methods of the present invention.

FIG. 2 is a simplified block diagram of computer system cluster utilizing some of the systems and methods of the present invention. Computing system 200 includes a computer cluster formed from cluster node 210 and cluster node 250. Computing system 200 also illustrates an example of an out-of-band virtualization scheme used to provide cluster nodes 210 and 250 with access to shared storage devices 170, 180, and 190. In the example illustrated, the virtualization of shared storage devices such as devices 170, 180, and 190 is accomplished using at least two system components, a virtual device configuration server that presents a consistent view of the shared storage and a virtual device configuration client (i.e., a client of the virtual device configuration server) that receives the virtualization information and uses it as part of the client's normal operation.

In the examples described below, the chief virtual device used will be a volume. In general, a volume is a virtual device or disk representing an addressable range of disk blocks used by applications such as file systems or databases. Thus, a volume appears to applications, databases, and file systems like a physical disk device, but does not have the physical limitations of a physical disk device. In some examples, a volume is logically formed from one or more subdisks, each subdisk comprising a set of contiguous disk blocks. Thus, a physical disk drive being subjected to virtualization may be divided into one or more subdisks. Moreover, these physical disk drives can be organized into one or more disk groups. In general, a disk group is a collection of disks that share a common configuration, e.g., a set of records containing detailed information on the objects created to support the virtualization scheme (such as disk and volume attributes) and their relationships. Disk groups provide logical collections that facilitate management of the virtualization scheme. For example, in many embodiments a given volume is configured from disks that belong to the same disk group. In still a further refinement, subdisks are organized into one or more virtual devices called plexes which are in turn used to form volumes. Numerous different schemes can be used to organize portions of or entire physical disks and present them as virtual devices. The volume description presented in this application is but one example and should not be considered as a limiting example in the context of virtual device configuration generally, or in the context of virtual device configuration entities such as virtual device configuration clients and servers.

Volume server 280 provides an example of a virtual device configuration server. Volume server 280 provides for out-of-band virtualization of storage to its clients, namely cluster nodes 210 and 250. As virtual device configuration clients of volume server 280, cluster nodes 210 and 250 are considered volume clients of the volume server. Although computing system 200 is shown having only one volume server and two volume clients, other implementations can possess several hosts providing the volume server functionality (at least two would be used in order to provide for load balancing and high availability) and a number of volume clients. In one embodiment, a plurality of volume servers is used in the distributed virtualization environment, each acting as a backup for the other. Thus, if one volume server crashes or otherwise becomes inaccessible, a second server takes over the management of disk groups and therefore coordinator volumes in the disk group. Volume clients are hosts that run the application loads including, in the present examples, clustering software. Volume clients provide volume manager functionality to their applications by exposing one or more volumes established by the volume server as "attached" volumes or "proxy" volumes. The proxy volume is created via an attach operation which involves contacting the volume server, receiving volume mapping information from the volume server, and then locally recreating the volume or volumes using this mapping information.

Although not illustrated in FIG. 2, further refinements of the volume client/server model can be envisioned. For example, it might be cumbersome to individually manage each volume client, its attached volumes, and volume servers including the physical storage and the volume(s) they serve. Therefore, mechanisms for organizing or grouping volume servers, associated volume clients, and a set of storage into a logical group would be useful. Such a logical entity can be called a domain. Central management of this domain can be efficiently accomplished by a specialized device or host operating as a domain storage server. In addition to management service(s), a domain storage server can also monitor the volume servers and the storage used by the volume servers. A still further level of control can be implemented by another storage server, e.g., a global storage server, used to manage various domains. In other examples, the functionality of a domain storage server and a global storage server can be implemented in a single entity, e.g., a single host device, or even combined with the functionality of a volume server.

In support of the virtualization scheme illustrated, volume server 280 implements the out-of-band virtualization for the storage it serves and presents that virtualization to its client(s). Thus, volume server 280 possesses volume manager software enabling physical resources configured in the computer system to be managed as virtual devices or volumes. These virtual devices or volumes are typically identified by a device name or other identifier in order that they may be made available to and/or accessed by other entities such as volume clients. Volume manager software can be part of the operating system executing on node volume server 280, or it can comprise one or more specialized components such as the VERITAS Volume Manager™ product provided by VERITAS Software Corporation. In addition to the typical volume management functions provided, volume server 280 also implements the server side of a communications protocol between itself, volume clients, and (if implemented) one or more domain or global storage servers. In general, the protocol is designed to pass sufficient information about the virtualization scheme, e.g., volume maps, so that a volume client can access the virtual devices established by the volume server. Such protocols typically include control messaging schemes for indicating, for example, which volume clients have access to which volumes and the nature of that access, e.g., read only, read and write, and exclusive access. Thus volume server 280 also typically implements one or more control mechanisms for reserving, locking and granting access to various portions of storage that it has virtualized.

In one embodiment, a delegation model is utilized as part of the volume client/server protocol to manage volume client access to volumes established by the volume server. While servicing a volume attach request, a volume server passes on the volume mapping information to the volume client, and grants it permission to use the volume for a fixed interval of time known as a delegation interval. Upon a successful attach on the volume client, a delegation timeout timer begins. The delegation timer is renewed periodically based on messages from the volume server and/or message exchange between the volume client and server. The delegation timer serves as the primary means of maintaining the relationship between the volume server and the volume clients. When a volume undergoes reconfiguration (e.g., the volume is resized), the volume server revokes the delegation of the volume clients causing I/O operations pending on the volume client to pause. The volume server then makes the configuration change, and subsequently renews the delegation to the volume clients by passing them the new volume configuration. The volume clients can then resume the I/O operations using the new volume configuration.

Additionally, the protocol shared by volume clients and volume servers can support the transfer of normal data, e.g., data that is part of an I/O operation. For example, in contrast to the case where a volume client accesses a storage device based on the volume information received from a volume server, a volume client can prepare the I/O operations, e.g., a read or a write operation, and transfer those operations to the volume server for execution by the volume server. Such remote I/O techniques are useful where, either by accident or by design, a volume client has no connectivity to the storage comprising the volume.

The protocol shared by volume clients and volume servers can also support different types of allowed I/O access by a volume client to a particular attached volume. For example, when a volume client attempts to attach a volume, it can specify the type of I/O access desired, such as: read/write (e.g., the volume client has both read and write access to the volume but imposes no access restrictions on other volume clients attempting to attach the same volume); read only (e.g., the volume client has only read access to the volume and imposes no access restrictions on other volume clients); exclusive write (e.g., the volume client has exclusive write access to the volume but other volume clients are allowed to attach the same volume with read only access); and exclusive access (e.g., the volume client has both read and write access to the volume and no other volume clients can attach the same volume). Still other I/O access types can be implemented. As will be seen below, various exclusive access types are useful in implementing the fencing techniques described herein.

Since this is an out-of-band implementation, control information between volume clients such as cluster nodes 210 and 250 and volume server 280 will typically be transmitted on communications paths separate from the normal data flow. In the example of FIG. 2, such control information can be transmitted among cluster nodes 210 and 250 and volume server 280 via LAN/WAN 150 using a network protocol such as TCP/IP. In other examples, cluster nodes 210 and 250 and volume server 280 can implement a dedicated network for message passing, similar to the private network 240 used for maintaining the cluster formed by cluster nodes 210 and 250, or cluster nodes 210 and 250 and volume server 280 can make use of a communication mechanism provided by SAN 160.

In general, those having ordinary skill in the art will understand a variety of variations in the implementation of the virtualization schemes used in conjunction with the systems, methods, apparatus and software described herein. Such variations can include the type and granularity of the virtual devices implements as well as the variations in the specific hardware and software used to implement the virtualization scheme.

In addition to the volume management and protocol implementing software described above, volume server 280 includes volume mapping information 285 and 290. Although typical implementations may treat all volume descriptions in a similar manner, data volume descriptions 285 are distinguished from coordinator volume descriptions 290 because coordinator volume descriptions 290 (and the corresponding coordinator volume or volumes) are used to manage cluster partition events as described below. Thus, the one or more coordinator volumes associated with coordinator volume descriptions 290 are not typically used for application data (e.g., used by file systems, database management systems, or other applications, but rather are used by clustering software (e.g., clustering software 225 and 265) to maintain the cluster. However, just as data volumes, coordinator volumes can be formed from one or more portions of physical storage devices such as one or more disk drives in either JBOD 180 or intelligent storage array 190. Moreover, any volume (including a coordinator volume) as presented by the volume server can be formed using one or more portions of a variety of different physical storage devices including: magnetic disk devices, optical disk devices, tape devices, volatile RAMs, non-volatile RAMs, and, any other data structure in memory or integrated circuit device that can support desired access semantics. In many implementations, only a single coordinator volume will be used for each cluster. However, in other embodiments multiple coordinator volumes can be used.

Cluster nodes 210 and 250 each implement a variety of software applications/modules. Such nodes typically include one or more applications (215 and 255) such as database administration systems (DBMS), file servers, application servers, web servers, backup and restore software, customer relationship management software, and the like. Cluster nodes 210 and 250 also typically include operating system software (235 and 275), volume client software (230 and 270), clustering software (225 and 265) and file system software (220 and 260). Still other software can be implemented on cluster nodes 210 and 250 in support of various types of functionality. Cluster node software can initiate or request that I/O operations be executed against storage devices such as 170, 180, and 190 utilizing volume information presented via volume client software 230 and 270.

A variety of software mechanisms are employed to both enable clustering functionality and prevent data corruption. Since computing system 200 is implemented in an out-of-band virtualization context, clustering software 225 and 265 typically does not include cluster volume management software. Instead, volume management is coordinated among volume client software (230 and 270) and volume server software. Clustering software 225 does typically include a cluster monitor that regularly checks the status or "health" of each node in the cluster to quickly and reliably determine when a node stops functioning (or stops functioning properly) and inform the remaining nodes so that they can take appropriate action. In some embodiments, a cluster messaging service, which can be a part of cluster monitor and/or a separate software or hardware system, exists to quickly and reliably communicate cluster-critical information among the nodes in a secure manner. Additionally, a cluster locking mechanism provides distributed locks that are used by instances of a cluster application to achieve proper coordination. In some embodiments, this is achieved through the use of a formalized distributed lock manager. In still other embodiments, the lock management is implemented in an ad hoc fashion using the messaging services to communicate and coordinate the state. These software tools operate in conjunction with applications, database management systems, file systems, operating systems, etc., to provide distributed clustering functionality. As part of the this functionality, clustering software 230 and 265 implements fencing algorithms that use the coordinator volume.

Figure 3:
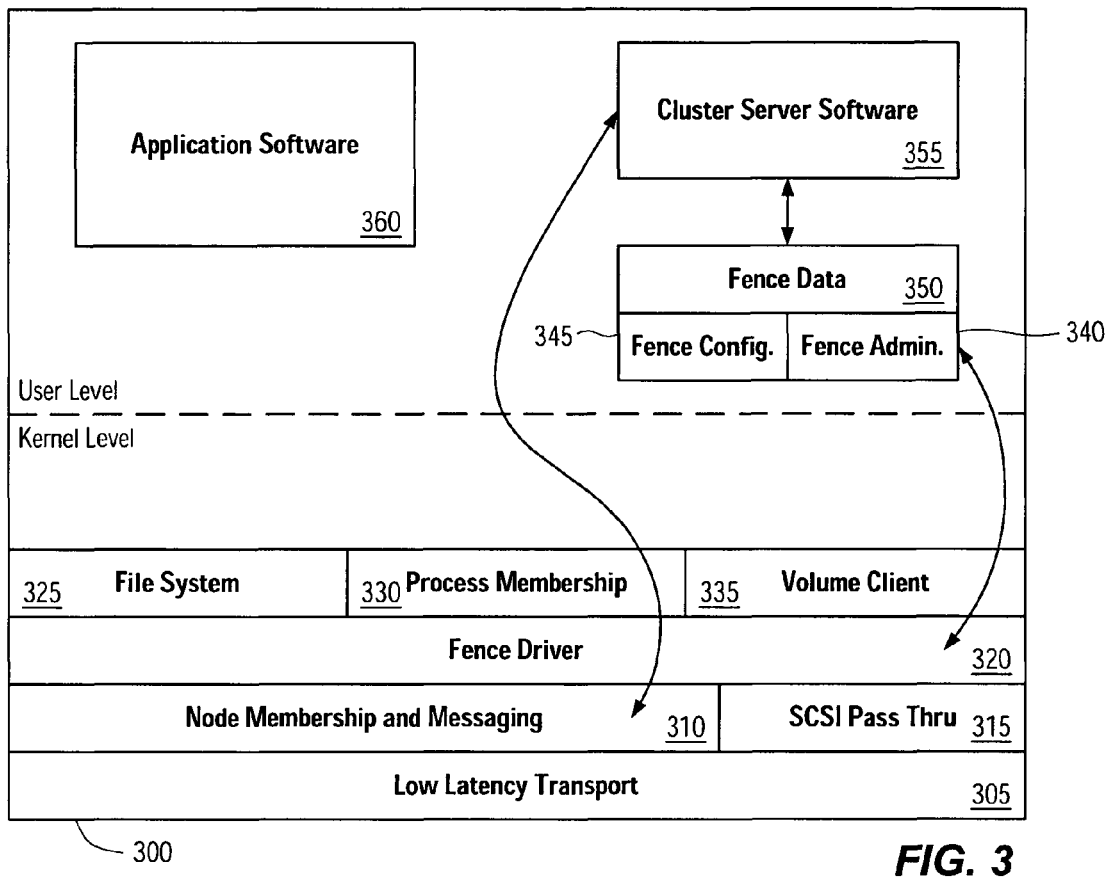
FIG. 3 illustrates some of the software components of a computer system cluster as executed on one node of the cluster.

FIG. 3 illustrates some of the software components of a computer system cluster as executed on one node of the cluster. Memory 300 is a representative memory space of a cluster node. In general, the software components are divided into those components operating at the kernel level, and those operating at the user level, as is well known in the art. Kernel level components include some basic software components supporting cluster operation. For example, low latency transport 305 provides high-speed kernel-to-kernel communications and monitors network connections between nodes. Node membership and messaging 310 is a kernel component that maintains and monitors node membership in the cluster. Node membership and messaging 310 can also provide a messaging mechanism to other software components, e.g., file system 325, process membership 330, volume client 335, and cluster server software 355. Alternatively, the functions performed by node membership and messaging 310 could be performed by software operating at the user level. SCSI pass through 315 is an example of a hardware driving component for sending SCSI commands from other components to SCSI devices, such as the data disks corresponding to volumes presented by a volume server. Fence driver 320 prevents ejected cluster nodes, i.e., nodes that have lost cluster membership because of some connectivity failure, from accessing shared storage resources and causing data corruption. Fence driver 320 intercepts messages from node membership and messaging 310 to other software components. For example, when node membership and messaging 310 informs other software components that communication with another cluster node has been lost, i.e., that the cluster has partitioned, fence driver 320 intercepts this message and begins taking action to protect shared resources. File system kernel component 325 provides and/or supports additional (beyond typical operating system file system capabilities) file system features including for example: quick-recovery, journaling, backup without data lock out, and online file system resizing. Process membership component 330 monitors and controls the membership of processes in the node and ensures that information on current member processes remains the same on all cluster nodes. Volume client 335 supports the out-of-band virtualization schemes described above.

Those having ordinary skill in the art will readily recognize that a variety of different additional kernel components can be (and typically are) utilized by a cluster node. Many of the components described above as well as some of the user level components described below are part of one or more of the VERITAS Volume Manager™, VERITAS File System™, and VERITAS Cluster Server™ products provided by VERITAS Software Corporation.

Fence driver 320 can operate in conjunction with fence configuration software 345, fence administration software 340, and fence data 350. For example, fence configuration software 345 can be used by a system operator to specify and initial information stored in a coordinator volume, e.g., which nodes are part of the cluster, as well as to configure fence driver 320. For those devices to which an attached volume maps, volume client 335 can issue to SCSI pass through 315 the SCSI-3 PR commands for reading and displaying keys, registering with devices, making a reservation with a device, removing registrations made by other devices, reading reservations, and removing registrations. In alternate embodiments, a volume server can present virtual devices that appear as SCSI LUNs. In such an implementation, data disk access (and potentially coordinator device access) may be achieved through volume client 335 or other software. Together with fence driver 320 and volume client 335, components 340, 345, and 350 provide core functionality for the I/O fencing services used to prevent data corruption. Note that one or more of components 340, 345, and 350 can be included within other components, and/or several components can be combined.

The user level can also include software components such as the previously mentioned cluster server software 355 and application software 360, e.g., a database program.

Fencing driver 320 uses the above-described coordinator volume as part of the I/O fencing operation. The use of coordinator volumes enables fencing driver 320 to resolve potential split-brain conditions within the context of virtualization schemes such as out-of-band virtualization. If a split-brain condition occurs, the lowest node in each subcluster "races" to gain control of the coordinator volume. The winning node remains in the cluster, and fence driver 320 fences losing nodes off from the shared data storage. Because these nodes lose their membership in the cluster (as reflected in membership records stored in the coordinator volume) the nodes remove themselves from the cluster ("commit suicide"). Thus, ejected systems cannot write to the data disks and corrupt data. If a node realizes that it has been ejected, it removes itself from the cluster.

Figure 4:
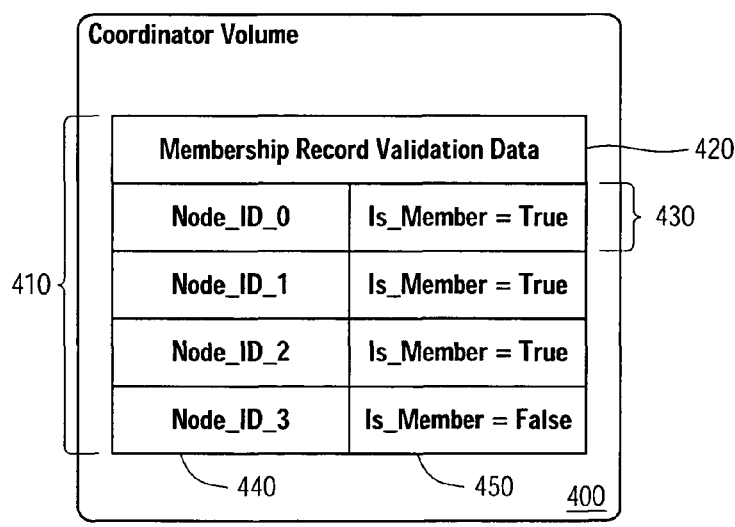
FIG. 4 is a simplified block diagram of a coordinator volume and cluster membership information.

FIG. 4 is a simplified block diagram of a coordinator volume and cluster membership information. In this example, coordinator volume 400 is made available by a volume server to volume clients in cluster nodes. Coordinator volume 400 typically includes cluster membership information 410 that includes membership record validation data 420, e.g., a record header, and one or more membership records 430. In the example illustrated, each membership record has two fields 440 and 450. Cluster node identification field 440 includes information identifying the each node that is (or might be) part of the cluster. This ID can be assigned by clustering software and may be unique to the cluster. Alternately, the ID in field 450 can be a volume client identifier, or even a more universal identifier. Data in field 450 indicates whether the corresponding node is currently a member of the cluster. As shown, typical values are either TRUE or FALSE, and thus this field could be implemented as a simple binary flag. Other information, e.g., timestamp information, domain membership information, etc., can be included in the membership records as needed or desired. As will be seen below, cluster nodes use membership information 410 to determine which nodes are or are not in the cluster and in some cases which nodes should or should not be kept in the cluster.

As already discussed, the physical resource associated with the coordinator volume can take a variety of forms. Perhaps the most common form is one or more portions of one or more disk drives. In such an implementation, it is desirable that the information stored in the coordinator volume and the coordinator volume itself be as fault tolerant as possible. Thus, the volume server responsible for the coordinator volume can use disk drives supporting persistent resource registration and reservation commands, and/or multiple disk drives to mirror the coordinator volume. One example of such commands is the small computer system interface version 3 (SCSI-3) persistent reservation and registration command set. However, any device command structure providing similar functionality can be used, and SCSI-3 persistent resource registration and reservation commands are only one example. Useful SCSI-3 commands include READ KEYS and READ RESERVATIONS persistent reservation in commands; and REGISTER, RESERVE, RELEASE, CLEAR, PREEMPT, and PREEMPT AND ABORT persistent reservation out commands. SCSI-3 defines both the physical interconnections between compliant devices and the commands which can pass among them. Devices which comply with the SCSI-3 standard can include: direct access devices, sequential access devices, printer devices, processor devices, write once read multiple devices, magnetic storage devices, compact disk (CD) devices, scanner devices, optical memory devices, media changer devices, communication devices, storage array devices, enclosure services devices, router devices, storage appliances, and simplified direct-access devices. The aforementioned devices are all examples of shared resources and shared data resources. SCSI-3 commands are described in *SCSI Primary Commands*—3 (SPC-3), Working Draft, Revision 03, T10, a Technical Committee of the Accredited Standards Committee of the National Committee for Information Technology Standards (NCITS), 10 Jan. 2002, which is hereby incorporated by reference herein in its entirety. SCSI-3 persistent reservation and registration commands are summarized at the end of this detailed description.

Although a volume server will typically access and maintain the device or devices implementing the coordinator volume using SCSI-3 persistent reservation and registration commands or the like, volume clients typically do not have direct access to the device or devices. Consequently, volume clients typically read and write to the coordinator volume using the aforementioned remote I/O techniques. In this manner of access, the physical mapping of the coordinator volume, including any SCSI-3 or other hardware features of the device is hidden from the volume client.

FIG. 5 is a flow chart illustrating initialization techniques of the present invention. In particular, FIG. 5 illustrates initialization of the coordinator volume and its use in maintaining a cluster. The initialization process begins at 500 where a user, administrator, or software entity has requested initialization. A coordinator volume is created at 510. This operation is typically performed by a volume server after receiving a specific instruction by a user to create a coordinator volume for use by a cluster. The physical resources to be used for the coordinator volume, e.g., disk drives, disk group, subdisks, etc, can be specified as part of the instruction. Additionally, coordinator volume characteristics such as size, redundancy, and layout type can also be specified at this time. Alternately, the volume server may already have certain resources reserved or defined for such an application. In general, the coordinator volume can be created from physical resources that are sharable among cluster nodes, or from physical resources accessible only through a volume server. The physical resources should have sufficient storage to contain cluster membership information. The coordinator volume can be replicated or mirrored for redundancy purposes. In another embodiment, multiple redundant volume servers exist for failover purposes, and so coordinator volume creation can involve operations on multiple volume servers. Once the coordinator volume is created, it is made available, e.g., exported, to all cluster nodes which in this case will also be volume clients of the volume server creating the coordinator volume.

Further configuration of the coordinator volume typically occurs via operation of clustering software, e.g., one or more of software 230, 340, and 345. As shown in 530, a cluster node attaches the coordinator volume. In this operation, the node typically attaches the coordinator volume using an exclusive write I/O access type thereby gaining exclusive write access to the coordinator volume so that no other node can modify the membership information stored in the coordinator volume. Once the node has the desired level of control over the coordinator volume, a membership record header, such as membership record validation data 420 shown in FIG. 4, is created (540). The membership record header typically includes membership record validation information, such as cluster identification information, timestamp information, checksum data, version information, or the like. This information can be used to subsequently validate the membership information in an effort to determine if the membership information has been corrupted in any way. The information stored in the membership record header can also be used for other purposes such as gathering statistics and presenting cluster status information.

Membership records are initialized in step 550 and typically take a form such as that described in connection with FIG. 4. The node performing this operation can create a record for itself and any other cluster nodes for which it has information. Since this is occurring as part of the overall initialization process, all of the cluster membership values are typically set to the false value. Once the membership records are complete, the information is written to the coordinator volume according to the principles of the established virtualization scheme. In some embodiments, some or all of the membership record header may not be determined until after the membership records are formed if, for example, the membership record header is to include a checksum value based on the contents of the membership records. This step concludes with a coordinator volume detach operation, thereby releasing the node's exclusive write access to the coordinator volume. The initialization process is complete at 570.

Figure 6:
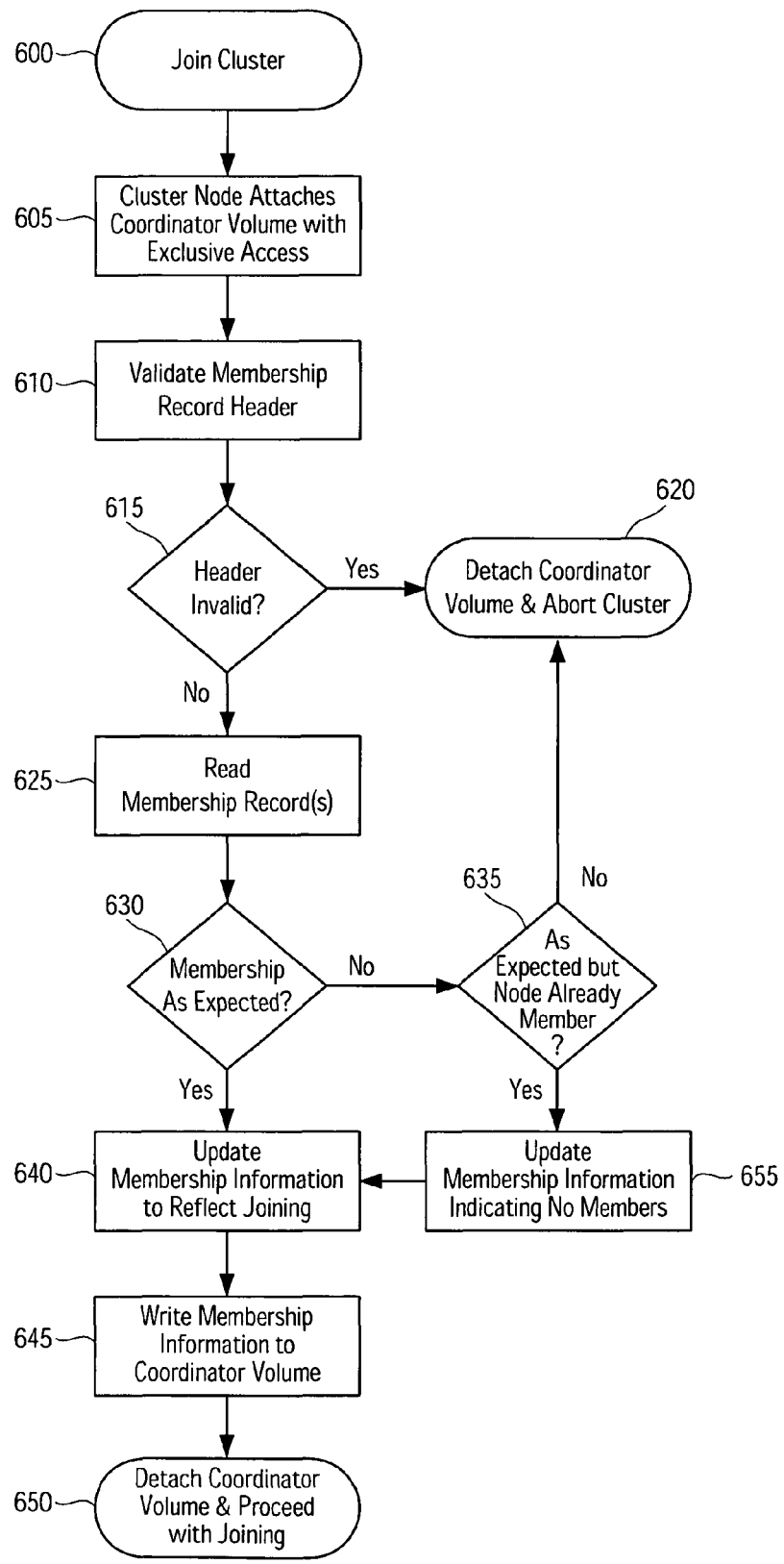
FIG. 6 is a flow chart illustrating cluster joining techniques of the present invention.

FIG. 6 is a flow chart illustrating cluster joining techniques of the present invention. In particular, FIG. 6 illustrates the process by which a node joins a cluster. The joining process begins at 600 where a user, administrator, or software entity requests that a node join a cluster. In one embodiment, the operations described are initiated and/or performed by fencing software such as fencing driver 320.

As shown in 605, the cluster node attaches the coordinator volume. In this operation, the node typically gains exclusive write access to the coordinator volume so that no other node can modify the membership information stored in the coordinator volume. In some instances, another node may already have control of the coordinator volume or the coordinator volume might otherwise be unavailable. If the node attempting to join receives such an indication, e.g., an error or unavailability message, the node may repeatedly retry to attach the coordinator volume until it either succeeds or reaches some predetermined timeout limit. Upon reaching a timeout limit, the process can terminate and an error message can be sent to a user or administrator (not shown). Once the node has successfully attached the coordinator volume, it attempts to validate the membership record header (610). This operation might include analyzing a checksum value or some other validation step. If the header and/or record is invalid as determined in 615, operation transitions to 620 where the coordinator volume is detached and the cluster join attempt is aborted, e.g., the join process terminates and the user is informed that the node could not join the cluster.

If the header and/or record not invalid, operation transitions to 625 where the one or more membership records are read from the coordinator volume. Once the membership information is extracted from the coordinator volume, it can be compared with cluster membership information received from other cluster nodes via, for example, messages received by node membership and messaging module 310. If the membership information from the coordinator volume agrees with the membership information on hand, e.g., those nodes reported to be cluster members are in fact cluster members according to the coordinator volume and those nodes who are not members (including the node attempting to join) are not shown as cluster members in the membership information form the coordinator volume (as determined in step 630), then operation transitions to 640. If there is some mismatch, further analysis is performed at 635. Here it is determined if the two sets of information match except for an indication from the coordinator volume that the node currently attempting to join is already a cluster member, e.g., its is_member value is already true. If it is the case that everything except the current nodes membership information is correct, then operation transitions to 655. In such an example, the node attempting to join realizes that some previous error condition, e.g., node or cluster crashes, coordinator volume corruption, has occurred because that node knows that it would not attempt to join a cluster to which it already belongs. If the analysis in step 635 indicates that there is some other mismatch between membership information available to the node trying to join and membership information from the coordinator volume, there is probably another cluster error condition, e.g., a pre-existing split brain condition, that needs to be addressed and operation transitions to 620 where the coordinator volume is detached and the cluster join attempt is aborted.

If operation does transition to 655, membership records are updated to indicate that no nodes are (or should be) members of the cluster, e.g., all is_member values are set to false. This operation is performed to reset the membership data after a prior cluster crash.

If it is determined in 630 that the membership information from the coordinator volume is as expected, or if step 655 was performed, the membership record for the node attempting to join is updated to reflect that it has joined, e.g., is_member=true, as shown in 640. Any new validation information is calculated, e.g., a new checksum value, and the revised membership information is written to the coordinator volume using the virtualization mechanisms implemented (645). Next, the coordinator volume is detached and the cluster node proceeds with any other cluster joining steps, e.g., starting certain applications, sending messages to other cluster members, and the like.

FIG. 7 is a flow chart illustrating cluster exit techniques of the present invention. In particular, FIG. 7 illustrates the process by which a node that is already a member of a cluster gracefully exits that cluster. The cluster exit process begins at 700 where a user, administrator, or software entity requests that a node leave a cluster. In one embodiment, the operations described are initiated and/or performed by fencing software such as fencing driver 320.

As shown in 710, the cluster node attaches the coordinator volume. In this operation, the node typically gains exclusive write access to the coordinator volume so that no other node can modify the membership information stored in the coordinator volume. In some instances, another node may already have control of the coordinator volume or the coordinator volume might otherwise be unavailable. If the node attempting to exit the cluster receives such an indication, e.g., and error or unavailability message, the node may repeatedly retry to attach the coordinator volume until it either succeeds or reaches some predetermined timeout limit. Upon reaching a timeout limit, the process can terminate and an error message can be sent to a user or administrator (not shown). Once the node has successfully attached the coordinator volume, it attempts to validate the membership record header (720). This operation might include analyzing a checksum value or some other validation step. If the header and/or record is invalid as determined in 730, operation transitions to 740 where the coordinator volume is detached and the cluster is aborted, e.g., the node immediately exits out of the cluster because the node was not able to update membership information in the coordinator volume.

If the header and/or record not invalid, operation transitions to 750 where one or more membership records are read from the coordinator volume. Once the membership information is extracted from the coordinator volume, it can be compared with cluster membership information received from other cluster nodes as needed. Next in 760, the membership record for the node leaving the cluster is updated to reflect its departure, e.g., setting is_member=false. Any new validation information is calculated, e.g., a new checksum value, and the revised membership information is written to the coordinator volume using the virtualization mechanisms implemented (770). Finally, the coordinator volume is detached and any additional cluster exiting steps are preformed (780).

Figure 8:
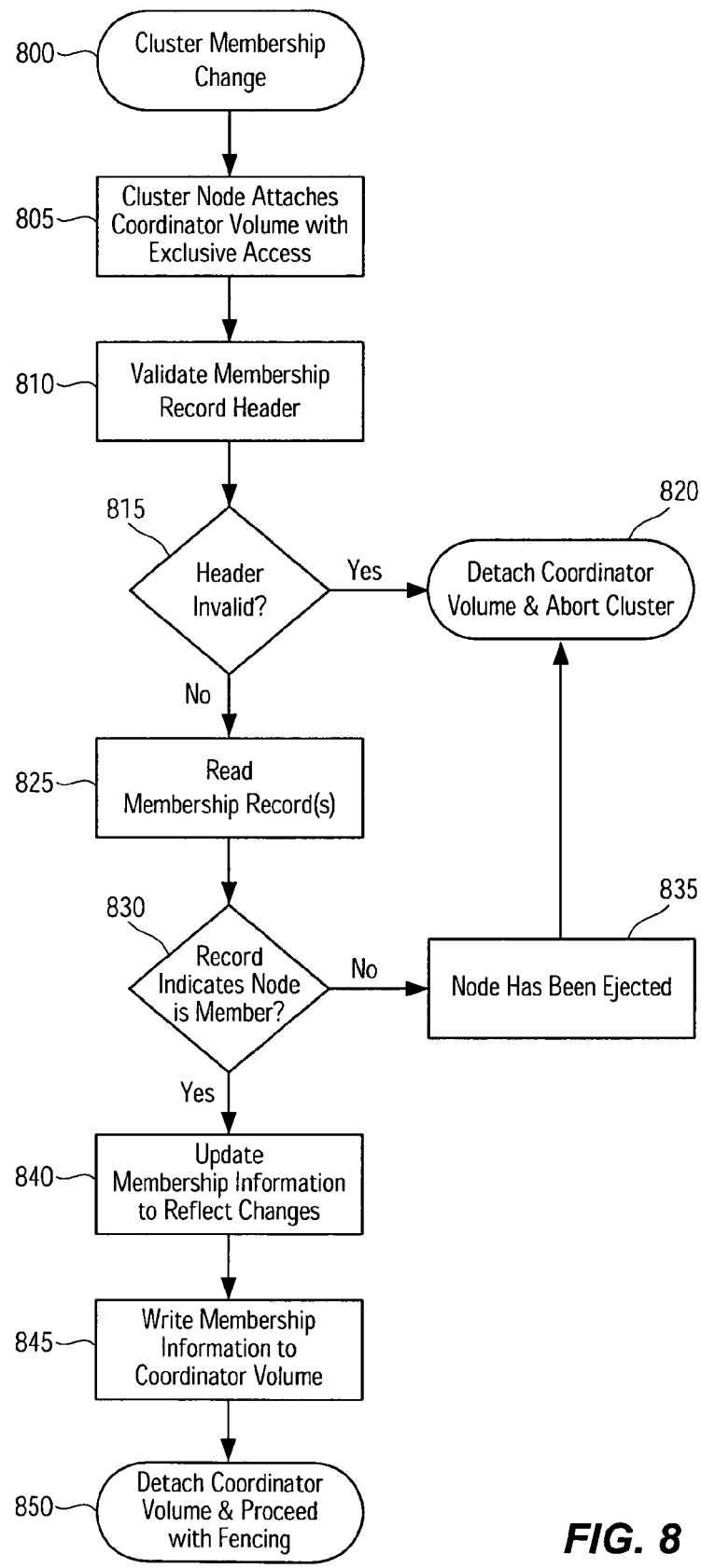
FIG. 8 is a flow chart illustrating cluster membership change techniques of the present invention.

In some circumstances, a cluster will learn of a change in membership, e.g., a node fails, either by monitoring the status of other nodes or by receiving a message from one or more other nodes. For example, if node membership and messaging 310 determines there has been a change in membership, the operations shown in FIG. 8 can be performed as part of a fencing operation. Operation begins at 800 where some indication in cluster membership has been received. As shown in 805, the cluster node attaches the coordinator volume. In this operation, the node typically gains exclusive write access to the coordinator volume so that no other node can modify the membership information stored in the coordinator volume. In some instances, another node may already have control of the coordinator volume or the coordinator volume might otherwise be unavailable. If the node reacting to the cluster membership change receives such an indication, e.g., and error or unavailability message, the node may repeatedly retry to attach the coordinator volume until it either succeeds or reaches some predetermined timeout limit. Upon reaching a timeout limit, the process can terminate and an error message can be sent to a user or administrator (not shown). Once the node has successfully attached the coordinator volume, it attempts to validate the membership record header (810). This operation might include analyzing a checksum value or some other validation step. If the header and/or record is invalid as determined in 815, operation transitions to 820 where the coordinator volume is detached and the cluster is aborted.

If the header is not invalid, the cluster membership records are read from the coordinator volume as shown in 825. If it is determined in 830 that the membership information from the coordinator volume indicates that the current node is no longer a member of the cluster, the current node concludes that it has been ejected from the cluster (835), e.g., as part of a fencing operation in response to a cluster partition, and operation proceeds to 820 where the coordinator volume is detached and cluster operation of that node is aborted.

If instead the current cluster determines at 830 that it is still a member of the cluster, membership information is updated (840) to correspond with any membership information received from other clusters or determined prior to initiating this process. For example, coordinator volume membership information for any nodes indicated as no longer belonging to the cluster (as determined from node membership and messaging 310) is updated to reflect that those nodes are no longer part of the cluster, e.g., there is-member values are set to false. Any new validation information is calculated, e.g., a new checksum value, and the revised membership information is written to the coordinator volume using the virtualization mechanisms implemented (845). Finally, the coordinator volume is detached and any additional fencing operations are preformed (850). The additional fencing operations can include, for example, the fence driver passing a list of volume client identifiers to the local volume client driver, the local volume client driver forwarding the fencing request to the volume server, and the volume server carrying out the SCSI-3 operations to preempt and abort the registrations of the specified nodes from the disks comprising the data volumes.

Figure 9:
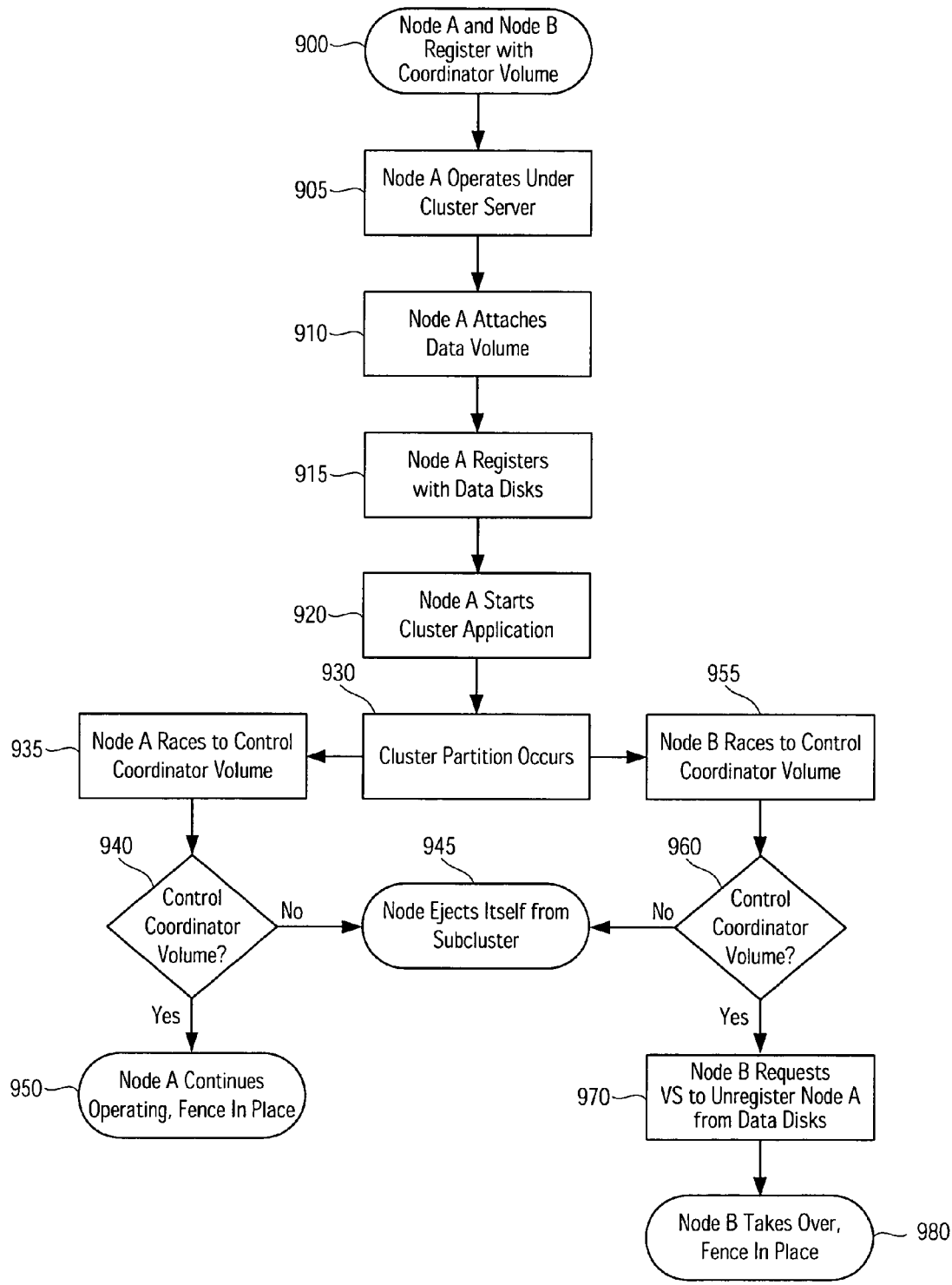
FIG. 9 is a flow chart illustrating fencing techniques of the present invention.

FIG. 9 is a flow chart illustrating more general fencing techniques of the present invention. Specifically, FIG. 9 illustrates operation where a two node (node A and node B) cluster experiences a private network failure, and thus the cluster is partitioned into two subclusters, each including only one node. In this example, the cluster might be configured for failover operation. A failover service only runs on one node at a time. If the node running the service fails, the service will be restarted on another node in the cluster. When the private network between the two nodes (providing heart beat information) fails, the two nodes lose contact with each other, thereby giving rise to a split-brain or partition event.

The process begins at 900 where the cluster application is not running on any nodes in the cluster. Each node in turn adds itself to the membership data in the coordinator volume ("registers" with the coordinator volume) by attaching the coordinator volume using exclusive access, as described above. Once registered, the cluster application begins on node A (905), either automatically or at the direction of a user/administrator and using appropriate cluster server software. As shown in 910, cluster node A then attaches the data volumes/disks using the above described volume client/server attach protocol. Since this is a failover cluster configuration, the attach operation requests exclusive access, i.e., only one of the nodes A or B, can attach to the data volume. In 915, node A registers with the data disks or volumes used by the cluster application. This registration may utilize persistent reservation commands as described above. Upon successful completion of the attachment with exclusive access, data disks or volumes will accept write requests, only from the registered node. Another cluster node or a volume client not belonging to the cluster attempting to write to the disk or volume will receive an error. Node A starts an appropriate cluster application in 920, and operation can now proceed normally.

In step 930, something has caused the cluster to partition. For example, a private network has failed and the two nodes lose contact with each, other. On one side of the partition is node A, and on the other side node B. The fence drivers on node A and node B race for control (935 and 955) of a coordinator volume since these nodes are the lowest node IDs (in this case the only IDs) in their respective subclusters. An example of these race and control operations is described above with respect to FIG. 8. In each of 940 and 960 the respective fencing drivers determines if they were successful in gaining control of coordinator volume and rewriting the membership data to exclude the other node.

One subcluster will win and the other subcluster will recognize the error condition that it has been excluded from the membership information in the coordinator volume. Finally in step 950 node A continues operation with the I/O fence in place. Had node A failed to gain control of the coordinator volume as determined in 940, node A would eject itself from the cluster 945. Correspondingly, a determination is made in 960 whether node B did gain control of the coordinator volume. If so, node B requests the volume server to ensure that node A is unregistered from data disks or volumes in step 970. If the volume server is able to communicate with node A, it may revoke the delegation from node A, otherwise it may use SCSI-3 persistent reservation commands to cut off node A's access to the data disks. Thus in 980, node B attaches the volume with exclusive access rights and takes over operation with an I/O fence in place. In performing this operation, node B can prevent data disks or volumes from accepting I/Os from other cluster nodes or volume clients not belonging to the cluster.

Figure 10:
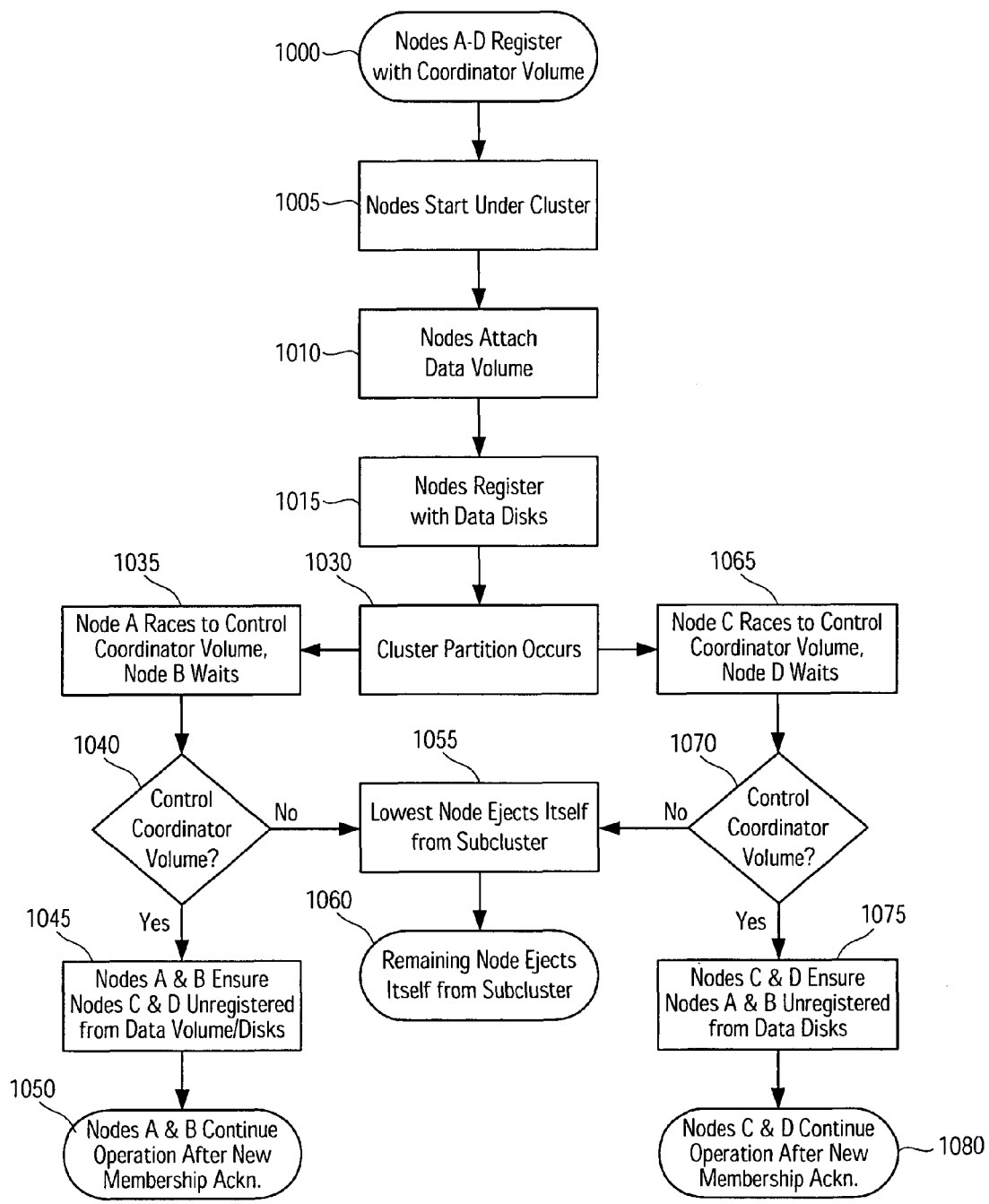
FIG. 10 is a flow chart illustrating other fencing techniques of the present invention.

FIG. 10 is a flow chart illustrating still other general fencing techniques of the present invention. Specifically, FIG. 10 illustrates operation where a four node cluster (nodes A-D) experiences a private network failure, and thus the cluster is partitioned into two subclusters, each including two nodes. In this example, the cluster is configured for parallel operation. A parallel service can simultaneously execute on two or more nodes. If the service fails on one node, it can be restarted on another node in the cluster. Thus, for example, each of nodes A-D executes the same cluster application. When the private network failed between nodes B and C, a split-brain or partition event has occurred. The cluster is partitioned into two subclusters, one having nodes A and B and the other having nodes C and D.

The fencing process begins at 1000 where the cluster application is not running on any nodes in the cluster. Each node adds itself to the membership map in the coordinator volume. Alternately, registration can occur manually when a system administrator configures the system. For example, a system administrator starts the cluster application on all of the registered nodes using appropriate cluster software at 1005. Alternately, this step can be performed as part of an automatic start-up process. In 1010, every node attaches the volumes, and in 1015 each node registers with the data disks comprising the volumes in an appropriate manner.

A node which is not registered and attempting to write to the disk will receive some manner of error indication. If there are additional nodes to start, e.g., nodes not started in 1000, steps 1005 and 1010 can be repeated as necessary. Moreover, if there are multiple paths between each node and the storage, this process may be repeated on a per path basis. Note that in a typical implementation, each subsequent node will not attempt to reserve data disks or volumes because the volume server creates the reservations on the disks when it imports the disk group.

In step 1030, something has caused the cluster to partition. For example, the private network has failed and nodes A and B lose contact with nodes C and D. On one side of the partition are nodes A and B, and on the other side nodes C and D. The fence drivers on node A (lowest node in its subcluster) and node C (lowest node in its subcluster) race for control (1035 and 1065) of the coordinator volume since these nodes are the lowest node IDs in their respective subclusters. This is performed by node A attempting to unregister nodes C and D from the coordinator volume while node C is attempting to do the same to nodes A and B. In each of 1040 and 1070 the respective fencing drivers determines if they were successful in gaining control of the coordinator volume and removing the members of the other subcluster from the membership information in the coordinator volume.

One subcluster will win and the other subcluster will recognize that its members have been ejected from the membership information in the coordinator volume. In 1045, node A has won the race, and it broadcasts a message to that effect to other nodes. Node A, and possibly node B, requests the volume server to make sure that nodes C & D are unregistered from the data disks. For example, it may be the case with multiple shared data resources in the cluster that node A does not have access to all of the same shared data resources as node B. In that case, it is important that both nodes unregister nodes C and D from the data disks or volumes. When each node has finished its fencing operation, it broadcasts an appropriate message. Upon receipt of these messages, nodes A and B deliver the new cluster membership information to appropriate software, e.g., file system software, cluster server software, and application software. The unregistration process causes nodes C and D to lose their registrations and therefore to no longer be able to write to the data disks or volumes. Once nodes A and B receive acknowledgment that membership information has been received, they continue operation with the I/O fence in place as shown in step 1050.

Had node A failed to gain control of the coordinator volume as determined in 1040, node A would eject itself in 1055. As the remaining node in a subcluster whose lowest node has ejected itself, node B determines that it must eject itself from the subcluster (1060). Correspondingly, a determination is made in 1070 that node C did gain control of coordinator volume. Node C broadcasts a message to that effect to other nodes. Nodes C and D eject nodes A and B in step 1075. Operation of step 1075 is similar to 1045 and so node D can participate in the fencing operation. Thus in 1080 nodes C and D receive acknowledgment that membership information has been received, and they continue operation with the I/O fence in place.

The flow charts of FIGS. 5-10 illustrate some of the many operational examples of the I/O fencing tools and techniques disclosed in the present application. Those having ordinary skill in the art will readily recognize that certain steps or operations illustrated in FIGS. 5-10 can be eliminated or taken in an alternate order. Moreover, the methods described in FIGS. 5-10 are typically implemented as one or more software programs for a computer system and are encoded in a computer readable medium as instructions executable on one or more processors. The computer readable medium can be any one of an electronic storage medium, a magnetic storage medium, an optical storage medium, and a communications medium conveying signals encoding the instructions. Separate instances of these programs can be executed on separate computer systems in keeping with the multi-process methods described above. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above can be utilized in a variety of different storage devices and cluster systems with variations in, for example, the number of nodes, the type of cluster operation (failover, parallel, etc.), the number and type of shared data resources, the number of paths between nodes and shared data resources, and the number and type of coordinator resources. Similarly, the techniques described above can be used in a variety of hardware architectures that might not represent conventional cluster configurations, such as a storage appliance including a number of processors at least one of which operates as a virtual device configuration server and at least another of which operates as a portion or all of a virtual device configuration client.

Figure 11:
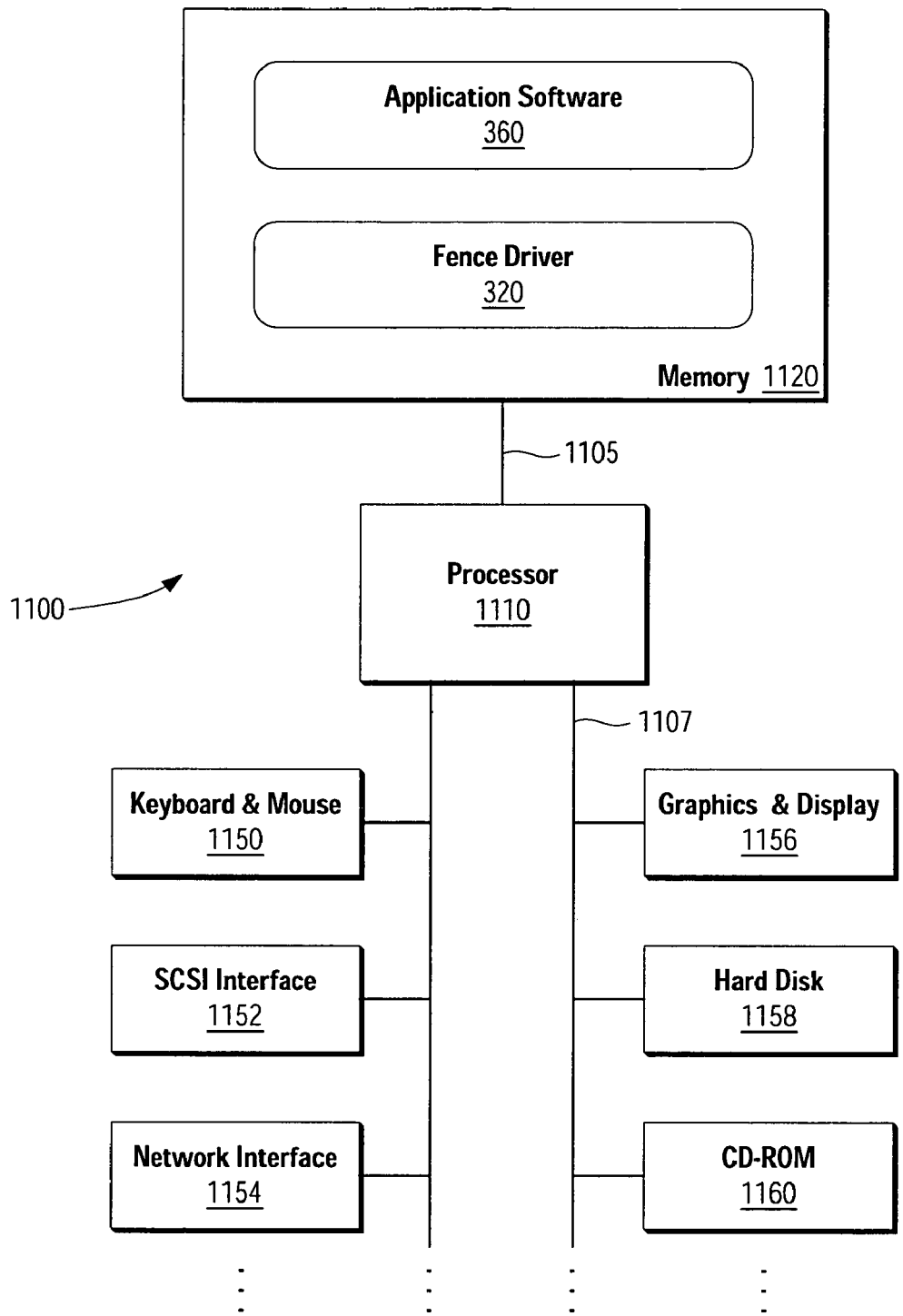
FIG. 11 is a block diagram of a computer system for implementing the techniques of the present invention.

FIG. 11 illustrates a block diagram of a computer system 1100 for implementing the I/O strategy of the present invention. For example, computer system 1100 can be an embodiment of one of the previously described cluster nodes, client computer systems, host computer systems, or even network and storage appliances. Computer system 1100 includes a processor 1110 and a memory 1120 coupled together by communications bus 1105. Processor 1110 can be a single processor or a number of individual processors working together. Memory 1120 is typically random access memory (RAM), or some other dynamic storage device, and is capable of storing instructions to be executed by the processor, e.g., application software 360 and fence driver 320. Memory 1120 is also used for storing temporary variables or other intermediate information during the execution of instructions by the processor 1110.

Those having ordinary skill in the art will readily recognize that the techniques and methods discussed below can be implemented in software using a variety of computer languages, including, for example, traditional computer languages such as assembly language, Pascal, and C; object oriented languages such as C++ and Java; and scripting languages such as Perl and Tcl/Tk. Additionally, software 260 and 270 can be provided to the computer system via a variety of computer readable media including electronic media (e.g., flash memory), magnetic storage media (e.g., hard disk 1158, a floppy disk, etc.), optical storage media (e.g., CD-ROM 1160), and communications media conveying signals encoding the instructions (e.g., via a network coupled to network interface 1154).

Computer system 1100 also includes devices such as keyboard & mouse 1150, SCSI interface 1152, network interface 1154, graphics & display 1156, hard disk 1158, and CD-ROM 1160, all of which are coupled to processor 1110 by communications bus 1107. It will be apparent to those having ordinary skill in the art that computer system 1100 can also include numerous elements not shown in the figure, such as additional storage devices, communications devices, input devices, and output devices, as illustrated by the ellipsis shown. An example of such an additional computer system device is a fibre channel interface.

Although the systems, methods, apparatus and software described herein have been generally explained in the context of out-of-band virtualization implementations, some embodiments can be implemented in an in-band virtualization context. In those cases, hardware and/or software entities operating in an in-band storage virtualization device will implement functionality similar to the above described volume clients and volume servers. Thus, systems, methods, apparatus and software described herein can be used in a variety of virtual device configuration implementations.

Although the present invention has been described with respect to a specific preferred embodiment thereof, various changes and modifications may be suggested to one skilled in the art and it is intended that the present invention encompass such changes and modifications that fall within the scope of the appended claims.

What is claimed is:

1. A method comprising:
providing a coordinator virtual device corresponding to a portion of a physical data storage device;
detecting when a computer system cluster, including a plurality of nodes, is partitioned;

a first node of the plurality of nodes engaging in a race with a second node of the plurality of nodes to gain control of the coordinator virtual device; and removing the first node of the plurality of nodes from the computer system cluster in response to the first node failing to gain control of the coordinator virtual device by losing the race, wherein the removing comprises disabling the first node from accessing the portion of the physical data storage device.

2. The method of claim 1 wherein the providing the coordinator virtual device corresponding to the portion of the physical data storage device further comprises:

selecting the portion of the physical data storage device;

associating a physical description of the portion of the physical data storage device with a coordinator virtual device identifier; and allowing at least one of the plurality of nodes of the computer cluster to access the portion of the physical data storage device via the coordinator virtual device identifier.

3. The method of claim 1 wherein the providing the coordinator virtual device corresponding to the portion of the physical data storage device is performed by at least one virtual device configuration server.

4. The method of claim 3 wherein the at least one virtual device configuration server is separate from the plurality of nodes of the computer cluster and wherein at least one of the plurality of nodes of the computer cluster further comprises a virtual device configuration client.

5. The method of claim 1 further comprising:

reading cluster membership information from the coordinator virtual device corresponding to the portion of the physical data storage device.

6. The method of claim 1 wherein the detecting when the computer system cluster, including the plurality of nodes, is partitioned further comprises:

reading, as performed by one of the plurality of nodes, cluster membership information from the coordinator virtual device corresponding to the portion of the physical data storage device; and determining whether the cluster membership information indicates that the one of the plurality of nodes is a current member of the computer system cluster.

7. The method of claim 1 further comprising:

writing cluster membership information to the coordinator virtual device corresponding to the portion of the physical data storage device.

8. The method of claim 1 wherein the coordinator virtual device corresponding to the portion of the physical data storage device further comprises cluster membership information.

9. The method of claim 1 wherein the coordinator virtual device corresponding to the portion of the physical data storage device is a coordinator volume.

10. The method of claim 1 wherein the detecting when a computer system cluster is partitioned further comprises:

monitoring a network coupled to each of the plurality of nodes for a heartbeat signal; and determining when the heartbeat signal is not present for a specified period of time.

11. The method of claim 1 encoded in a computer readable storage medium as instructions executable on a processor, the computer readable storage medium being one of an electronic storage medium, a magnetic storage medium, and an optical storage medium.

12. The method of claim 1 further comprising:

allowing at least one of the plurality of nodes of the computer cluster to exclusively access the portion of the physical data storage device.

13. A system comprising:

a first data storage device;

a virtual device configuration server coupled to the first storage device and including a first memory and a first processor configured to provide a coordinator virtual device corresponding to a portion of the first data storage device;

a plurality of virtual device configuration clients configured as a computer system cluster, a first of the plurality of virtual device configuration clients including a second memory and a second processor configured to:

detect when the computer system cluster is partitioned, engage in a race with a second of the plurality of virtual device configuration clients to gain control of the coordinator virtual device corresponding to the portion of the first data storage device, and disable the first of the plurality of virtual device configuration clients from accessing the portion of the first data storage device by removing the first of the plurality of virtual device configuration clients from the computer system cluster in response to the first of the plurality of virtual device configuration clients failing to gain control of the coordinator virtual device by losing the race.

14. The system of claim 13 wherein the first data storage device is at least one of a disk drive, a JBOD, a disk array, and an integrated circuit.

15. The system of claim 13 wherein the first data storage device is coupled to the virtual device configuration server via a network.

16. The system of claim 13 wherein the virtual device configuration server is a volume server, wherein the coordinator virtual device is a coordinator volume, and the plurality of virtual device configuration clients is a plurality of volume clients.

17. The system of claim 13 wherein the first of the plurality of virtual device configuration clients is further configured to read cluster membership information from the coordinator virtual device corresponding to the portion of the first data storage device.

18. The system of claim 17 wherein the first of the plurality of virtual device configuration clients is further configured to determine whether the cluster membership information indicates that the first of the plurality of virtual device configuration clients is a current member of the computer system cluster.

19. The system of claim 13 wherein the first of the plurality of virtual device configuration clients is further configured to write cluster membership information to the coordinator virtual device corresponding to the portion of the first data storage device.

20. The system of claim 13 wherein the coordinator virtual device corresponding to at least a portion of the first data storage device further comprises cluster membership information.

21. The system of claim 13 wherein the first memory and the virtual device configuration server belong to at least one of a host computer system, a cluster node, a storage appliance, a network appliance, and a storage area network (SAN) switch.

22. An apparatus comprising:
- a means for providing a coordinator virtual device corresponding to portion of a physical data storage device;
- a means for detecting when a computer system cluster, including a plurality of nodes, is partitioned;
- a means for engaging a first node of the plurality of nodes in a race with a second node of the plurality of nodes to gain control of the coordinator virtual device; and
- a means for disabling the first node from accessing the portion of the first data storage device by removing a first node of the plurality of nodes from the computer system cluster in response to the first node failing to gain control of the coordinator virtual device by losing the race.

23. The apparatus of claim 22 further comprising:
- a means for reading cluster membership information from the coordinator virtual device corresponding to the portion of the physical data storage device.

24. The apparatus of claim 22 further comprising:
- a means for writing cluster membership information to the coordinator virtual device corresponding to the portion of the physical data storage device.

25. The apparatus of claim 22 further comprising:
- a means for determining whether cluster membership information stored in the coordinator virtual device corresponding to the portion of the physical data storage device indicates that the first node of the plurality of nodes is a current member of the computer system cluster.

* * * * *